US006542678B2

(12) United States Patent
Essiambre et al.

(10) Patent No.: US 6,542,678 B2
(45) Date of Patent: Apr. 1, 2003

(54) HIGH-DISPERSION FIBERS FOR HIGH-SPEED TRANSMISSION

(75) Inventors: Rene-Jean Essiambre, Red Bank, NJ (US); Benny Mikkelsen, Boston, MA (US)

(73) Assignee: Lucent Technologies, Inc., Murray Hill, NJ (US)

(*) Notice: Subject to any disclaimer, the term of this patent is extended or adjusted under 35 U.S.C. 154(b) by 166 days.

(21) Appl. No.: 09/812,497

(22) Filed: Mar. 19, 2001

(65) Prior Publication Data

US 2002/0141715 A1 Oct. 3, 2002

(51) Int. Cl.[7] .............................. G02B 6/02; H04B 10/12
(52) U.S. Cl. ........................... 385/123; 385/27; 385/28; 359/337.5
(58) Field of Search ............... 385/27, 28, 123, 385/24; 359/337.5, 338, 339

(56) References Cited

U.S. PATENT DOCUMENTS

| | | | | |
|---|---|---|---|---|
| 4,918,751 A | * | 4/1990 | Pessot et al. ............... 359/173 |
| 5,548,603 A | * | 8/1996 | Calvani et al. ............... 372/25 |
| 5,946,117 A | * | 8/1999 | Meli et al. .................. 359/124 |
| 6,011,615 A | * | 1/2000 | Mamyshev et al. ......... 356/73.1 |
| 6,137,924 A | * | 10/2000 | Strasser et al. ............... 385/11 |
| 6,141,090 A | * | 10/2000 | Mamyshev et al. ......... 356/73.1 |
| 6,249,630 B1 | * | 6/2001 | Stock et al. ................. 385/123 |
| 6,321,016 B1 | * | 11/2001 | Tirloni et al. ............... 385/127 |
| 6,480,656 B1 | * | 11/2002 | Islam et al. ................. 385/123 |

OTHER PUBLICATIONS

U.S. patent application Publication No. US 2001/0024307 A1, Franco et. al.*
U.S. patent application Publication No. 2002/0141715 A1, Essiambre et. al.*
U.S. patent application Publication No. 2002/0036812 A1, Bai.*
U.S. patent application Publication No. 2002/0090187, Tirioni et. al.*

* cited by examiner

Primary Examiner—Brian Healy
(74) Attorney, Agent, or Firm—Peter V. D. Wilde

(57) ABSTRACT

The specification describes an optical transmission system for high speed, high capacity digital pulse transmission, i.e. at least 10 Gb/s at a duty cycle of at least 10%, which uses transmission fiber with a dispersion value greater than 20 ps/(nm-km) or more negative than −5 ps/(nm-km). The system operates in the pseudo-linear transmission mode (PLTM). In the PLTM it was discovered that pulse distortion decreases, i.e. eye closure penalty actually decreases, as the dispersion value increases. System performance actually improves by increasing the value of absolute dispersion of the transmission fiber.

6 Claims, 2 Drawing Sheets

HIGH-DISPERSION FIBERS FOR HIGH-SPEED TRANSMISSION

FIELD OF THE INVENTION

This invention relates to fiber-optic communications systems, and more particularly to prescription on the range of values of fiber dispersion for the design of systems operating with high-speed, high-power transmission.

BACKGROUND OF THE INVENTION

With the advent of optical amplifiers which can compensate for fiber loss, the reach of fiber-optic communication systems at 10 Gb/s per channel and beyond, is limited largely by chromatic dispersion. Chromatic dispersion causes different parts of the signal spectrum to arrive at the distant end of the system at different times. An optical signal carrying information has a finite bandwidth (spread in wavelengths). If these wavelengths propagate at different velocities along the fiber, the pulses will be dispersed. The dominant cause of chromatic dispersion is material dispersion, the variation in the refractive index versus wavelength of silica, the basic material from which all low loss transmission fibers are made. However, the chromatic dispersion of a fiber can be tailored using waveguide dispersion. The magnitude of waveguide dispersion can be made as large or larger than the material dispersion.

Dispersion is especially deleterious in wavelength-division multiplexed (WDM) systems because the optical bandwidth required to accommodate multiple signals is wide relative to single-channel systems. Systems designed for C-band/L-band require transmission capability from 1530 to 1600 nm. Even wider band systems are now being contemplated and are likely to become commercial in the future.

To overcome the problem of dispersion of the signal before the advent of dispersion compensation a low-dispersion fiber called dispersion shifted fiber (DSF) has been invented. However, wavelength-division multiplexed (WDM) transmission suffers from non-linear distortion due to four-wave mixing (FWM) in DSFs. A fiber with moderate dispersion, referred to as non-zero dispersion shifted fiber (NZDSF) has been invented to reduce the effect of FWM. Such fiber, along with standard unshifted fiber (STD), requires dispersion compensation for proper transmission at 10 Gb/s per channel and above. However, NZDSF requires less dispersion compensation than STD fiber because NZDSF has a value of dispersion 3 to 4 times smaller than STD fiber (dispersion is ~4 ps/(nm-km) at 1550 nm as opposed to ~17 ps/(nm-km) for STD fiber).

For high-speed systems (40 Gb/s per channel and above, or 10 Gb/s with short pulses, i.e. 15 ps pulse duration or less) the effect of high dispersion of the transmission fiber is to broaden the pulses considerably so that neighboring pulses from the same channel overlap within each span. Conventional wisdom would suggest that one should avoid such pulse overlap as it will produce signal distortion due to non-linearity. However, it was found that it is possible to transmit a signal even in the presence of pulse overlap. This regime is referred to as pseudo-linear transmission. Even though pseudo-linear transmission allows pulse overlap during transmission, distortions from pulse-to-pulse nonlinear interaction is the limiting factor for transmission. Pulse distortion is the expected result from dispersion in the fiber for high-speed systems.

STATEMENT OF THE INVENTION

We have discovered that inherent fiber dispersion affects signals transmitted in the pseudo-linear regime in a manner completely different than signals transmitted by conventional techniques. Surprisingly, using the pseudo-linear regime, optical pulses actually transmit with lower distortion in fibers with higher dispersion values. Use of fibers with dispersion values of more than 20 ps/(nm-km) would not be considered suitable for high-speed systems based on conventional design principles. However, we have found for instance that fiber with a dispersion value higher than 20 ps/(nm-km), yields improved system performance in terms of reduced eye closure penalty at high signal power levels. Optical pulse transmission in the regime of interest, and the regime to which this invention is applicable, is termed pseudo-linear mode transmission (PLMT), which is becoming a known and accepted mode in the art. For the purpose of this description it is defined by, inter alia, a transmission bit rate of at least 10 Gb/s, using optical pulses at wavelengths of 1.25 to 1.65 µm, with a duty cycle (pulse duration/pulse separation) of 10% to 50%, and a pulse duration of less than 15 ps.

DETAILED DESCRIPTION

Figure 1:
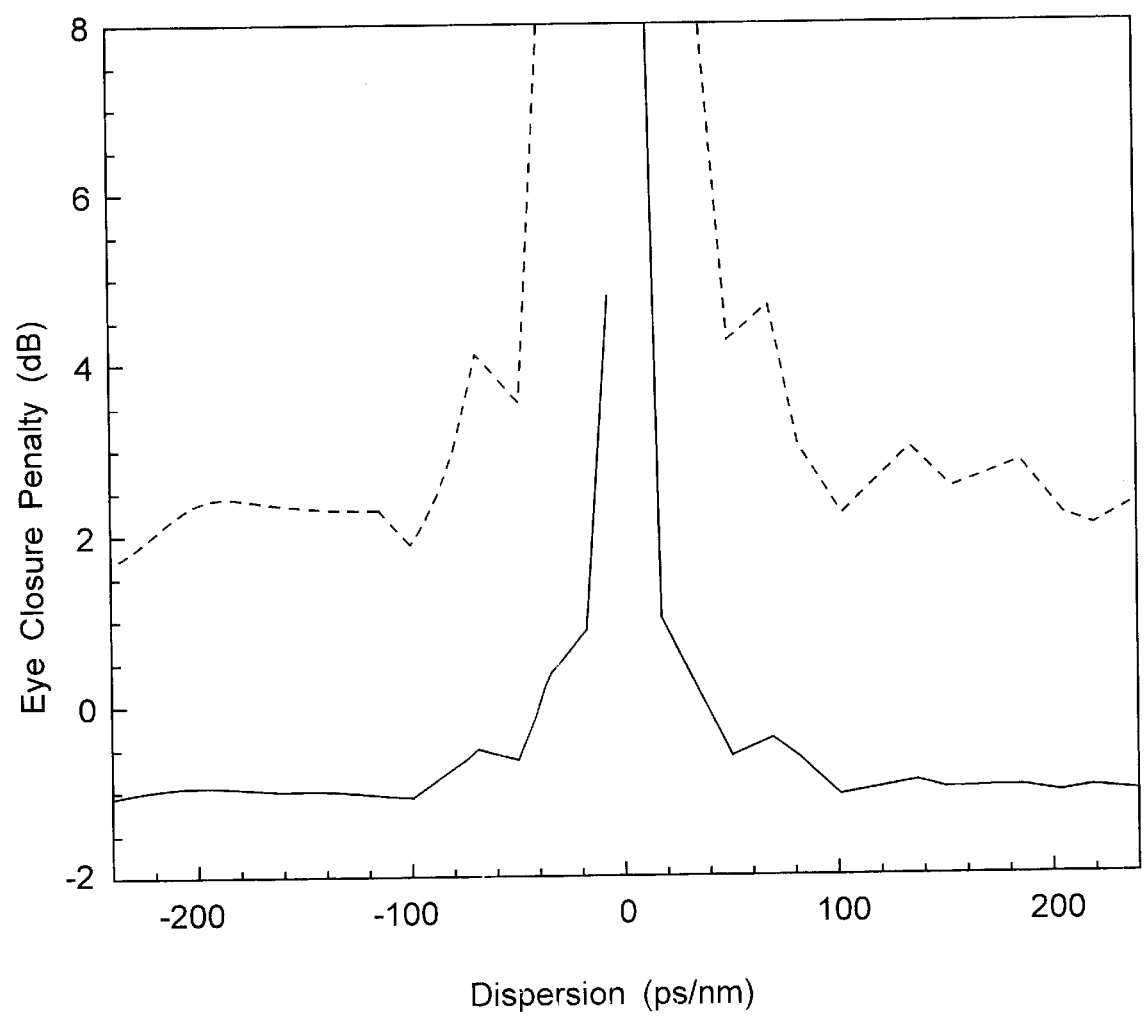
FIG. 1 is a plot of fiber dispersion vs. pulse distortion expressed as eye closure penalty for PLMT.
Figure 2A:
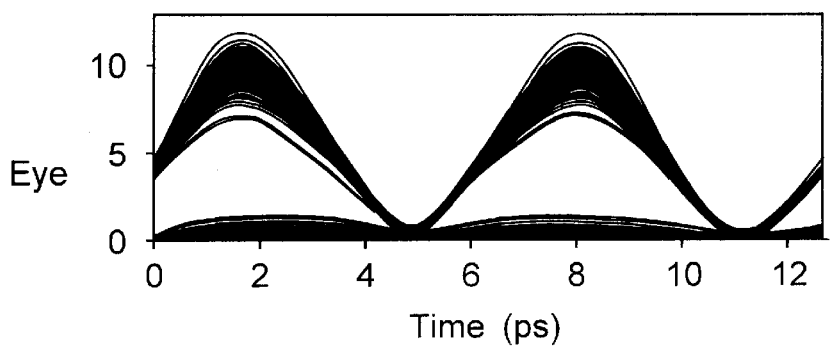
FIG. 2 shows eye diagrams for four different levels of fiber dispersion.
Figure 2B:
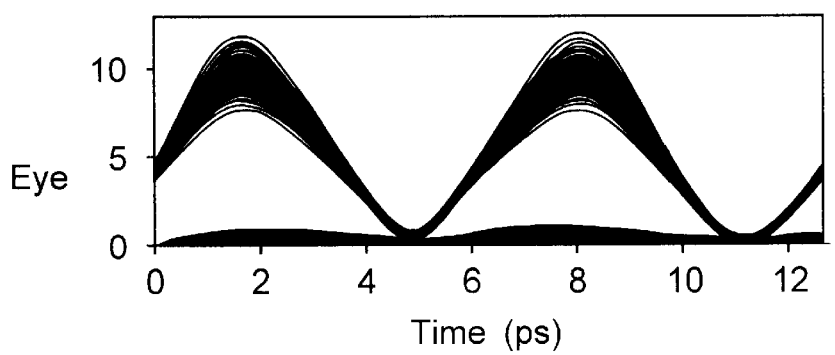
Figure 2C:
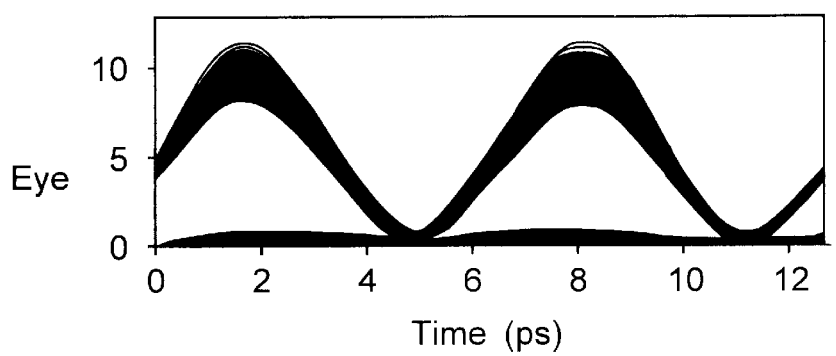
Figure 2D:
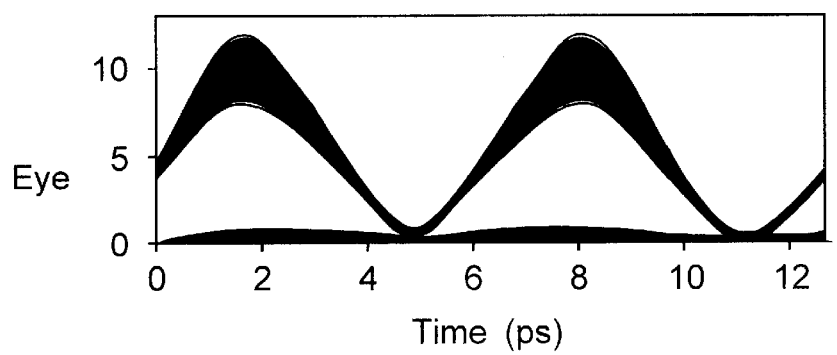

High capacity, large bandwidth, optical transmission systems of the invention comprise laser sources, modulators, multiplexers, long lengths of optical fiber, receivers, amplifiers, demultiplexers, and, typically, dispersion compensation means. Those elements of the system, and the characteristics of the information transmitted, which impact the invention will be addressed in the paragraphs set out below.

Source

A high speed data source comprises heterostructure lasers of known design operating in a pulse mode at 10 Gb/s or more, at a wavelength of 1.25 to 1.65 µm. In the WDM system, multiple wavelengths and multiple sources are used, one for each channel.

Bit Rate

State of the art systems operate at 10 Gb/s and higher. The established bit rate standard dictates bit rate increases by a 4× factor, thus yielding systems operating at 10, 40, 160, etc. Gb/s. A large number of optical transmission systems in the installed base operate at bit rates lower than 10 Gb/s. Typically these systems use relatively high dispersion fiber, i.e. NZDSF or STD fiber. However, systems with this fiber and operating at high speed (40 Gb/s and above) are not efficient. With the advent of PLMT systems, which provide efficient operation at high speed using these fibers, optimization of the transmission fiber in terms of dispersion characteristics has not been achieved.

Pulse Characteristics

The duty cycle recommended, according to the invention, is in the range 10% to 50%. The duty cycle D is related to the pulse duration $T_P$ and the pulse separation $T_B$, by:

$$D = T_P/T_B$$

Since the bit rate B of a system is related to the pulse separation by:

$$B = 1/T_B$$

then the duty cycle D can be expressed as:

$$D = T_P B$$

The pulse duration $T_P$ is defined as the pulse full width at half maximum power.

The duty cycle establishes the ultimate relative information density of the system, and can be used as a figure of merit of system utilization. Low duty cycle systems consume bandwidth since short pulses require greater relative channel separation. For systems that take advantage of the principles of the invention duty cycles of at least 10%, and preferably at least 20%, are recommended.

Very low duty cycle based systems, i.e. less than 10%, have been identified recently as attractive because transmission of very short pulses eases the system requirements for dispersion compensation. It allows, in some cases, a single dispersion compensation means installed at any point in the system. This may be important in systems where access is restricted at either the transmitting or the receiving end. However, as just mentioned, it consumes bandwidth which, in most applications, is the overriding design consideration. A 40 Gb/s system using a pulse length of 2 ps for example has a duty cycle of just 8%, considered low by the standard just set out.

For systems operating at 160 Gb/s per channel the pulse duration is reduced. Pulse durations regarded as very short in a 40 Gb/s system are considered relatively long at 160 Gb/s. The prescription for high dispersion also holds for 160 Gb/s systems using the recommended duty cycle of the invention, i.e. the recommended duty cycle stays roughly the same at 160 Gb/s relative to 40 Gb/s. Using a 10% minimum duty cycle in a 160 Gb/s system results in a recommended pulse length of 0.625 ps. At 20% minimum duty cycle, the pulse length is 1.25 ps. The recommended pulse duration $T_P$ for an arbitrary high-speed signal can be expressed using the bit rate as variable B as:

$$0.1 < T_P B < 0.5$$

Multiplexer/demultiplexer

Multiplexers and demultiplexers useful in the systems described here are standard, and require no detailed explanation. It is however, a characteristic of very high capacity systems, the preferred application of the invention, that they operate with many channels, e.g. 10 or more. More typically, very high capacity systems will operate with more than 10 channels in both the C band and the L band, giving a total of at least 20 channels. As the bit rate per channel increases the number of channels decreases while still maintaining a large total system capacity.

Amplifiers

Likewise, the amplifiers used in the system of the invention are typically standard erbium amplifiers. These are incorporated into the fiber where desired along the transmission path, and may comprise optical grating sections at the ends of an erbium doped fiber length, with the fiber length coupled to a 0.98 nm pump source.

Pulse Power

High power systems are generally considered to be those in which the non-linear characteristics of the transmission medium cause sufficient distortion to require the system design to address it in some form. With multiple tradeoffs ever present, a quantitative definition is usually only a relative measure. However, systems designed and constructed according to this invention would have typical time-averaged power levels in the range −6 to 12 dBm.

EXAMPLES

To demonstrate the principles of the invention, simulated measurements were made of pulse transmission in fibers with a number of different dispersion values. These provided plot points that are plotted in FIG. 1. The characteristic measured was the eye closure penalty in dB, a standard indicator of the pulse degradation due to non-linear and dispersion effects in the fiber. The fiber length used was 80 km, the wavelength was 1.55 μm, and the bit rate was 160 Gb/s. Data was generated for two duty cycles, 20% and 33%. Data for the 20% duty cycle is represented by the solid curve and data for the 33% duty cycle is represented by the dashed curve. The corresponding pulse duration was 1.25 ps and 2.1 ps respectively. These pulse durations are low in comparison to those recommended above, and reflect the change in pulse specifications as the bit rate increases by 4×. However, the duty cycles of 20% and 33% are typical for PLMT. Results for a 40 Gb/s system operating with pulse lengths of 5 ps and 8.3 ps respectively are expected to be qualitatively similar. The eye closure is a measure of the pulse distortion and essentially shows the latitude of discrimination between a one and a zero bit. From the data of FIG. 1 it is evident that the performance of the system actually improves as the dispersion increased. This anomalous behavior is completely contrary to conventional wisdom. For very high dispersion, i.e greater than 50 ps/nm, the eye closure penalty is very low, and actually levels off. Operating in this regime, where the slope of the dp/ds curve of the penalty p for dispersion s is less than 0.2, allows the dispersion characteristics of the fiber to be disregarded in system design. High dispersion levels impose more stringent requirements for design of the dispersion compensation means. However, advances in dispersion compensation tools are expected to allow cost effective designs of systems operating at high dispersion levels.

FIGS. 2A–2D show eye closure diagrams for different dispersion values as indicated in the following table.

| FIGURE | DISPERSION - ps/(nm-km) |
|--------|-------------------------|
| 2A | 17 |
| 2B | 34 |
| 2C | 51 |
| 2D | 68 |

The lower eye closure penalty corresponds to better system performance. A 2 dB penalty is generally considered as an upper limit for state of the art system design. FIG. 2 clearly shows that the optimum transmission occurs for highest value of transmission fiber dispersion for both duty cycles.

With reference again to the curves shown in FIG. 1, it is evident on inspection that the discovery of the benefit of using relatively high dispersion fiber includes both positive and negative values of dispersion. Use of optical fiber with negative dispersion values for transmission purposes, i.e. over 10 km lengths for example, is unusual. Thus the invention contemplates use of fiber for PLTM systems, in lengths suitable for transmission, with dispersion values below (more negative than) −5 ps/(nm-km) and preferably more negative than −8 ps/(nm-km). Therefore the broad range of dispersion values recommended is greater than 20 ps/(nm-km) and more negative than −5 ps/(nm-km) and preferably more negative than −8 ps/(nm-km).

Optical fibers used for transmission have very low loss so as to limit the number of repeaters required over a given length of fiber. Fiber lengths of 10 km or more are common. To distinguish from short fiber lengths used for dispersion compensation, or for relatively low performance systems, a fiber with a length of at least 1 km would generally be regarded as a transmission fiber.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. An optical signal transmission system comprising:
    a. a source of digital pulses, said pulses having:
        i. a bit rate B of at least 10 Gb/s,
        ii. a wavelength in the range 1.25–1.65 μm,
        iii. a pulse duration $T_P$ of less than 15 ps,
        iv. a duty cycle in the range 10%–50%,
    b. means for coupling the source of digital pulses to a length of optical fiber, said length of optical fiber being at least 1 km,
the invention characterized in that the length of optical fiber has a dispersion value of greater than 20 ps/(nm-km) or more negative than −5 ps/(nm-km).

2. The transmission system of claim 1 wherein the dispersion value is greater than 50 ps/(nm-km) or more negative than −50 ps/(nm-km).

3. The transmission system of claim 1 wherein the bit rate B and the pulse duration $T_P$ are related by:

$$0.1 < T_P B < 0.5.$$

4. A method for transmitting information in the form of optical digital pulses over a length of optical fiber comprising:
    a. providing a source of digital pulses, said pulses having:
        i. a bit rate of at least 10 Gb/s,
        ii. a wavelength in the range 1.25–1.65 μm,
        iii. a pulse duration of less than 15 ps,
        iv. a duty cycle in the range 10%–50%,
    b. transmitting the optical pulses along an optical fiber having a length of at least 1 km,
the invention characterized in that the optical fiber has a dispersion value of greater than 20 ps/(nm-km) or more negative than −5 ps/(nm-km).

5. The method of claim 4 wherein the dispersion value is greater than 50 ps/(nm-km) or more negative than −50 ps/(nm-km).

6. The method of claim 4 wherein the bit rate B and the pulse duration $T_P$ are related by:

$$0.1 < T_P B < 0.5.$$

* * * * *